United States Patent
Hawley et al.

(10) Patent No.: US 10,856,375 B2
(45) Date of Patent: Dec. 1, 2020

(54) MODULAR SOLAR LIGHTING AND POWER MANAGEMENT SYSTEM AND APPARATUS

(71) Applicant: Redi-Lite Pty Ltd, Hornsby (AU)

(72) Inventors: Mark Hawley, Hornsby (AU); Tony Flint, Hornsby (AU)

( * ) Notice: Subject to any disclaimer, the term of this patent is extended or adjusted under 35 U.S.C. 154(b) by 0 days.

(21) Appl. No.: 16/130,421

(22) Filed: Sep. 13, 2018

(65) Prior Publication Data

US 2020/0092964 A1 Mar. 19, 2020

(51) Int. Cl.
| | |
|---|---|
| *F21S 9/02* | (2006.01) |
| *H05B 47/14* | (2020.01) |
| *H05B 47/185* | (2020.01) |
| *H05B 47/19* | (2020.01) |
| *H05B 45/10* | (2020.01) |
| *F21S 9/03* | (2006.01) |
| *H02J 7/35* | (2006.01) |
| *H05B 45/37* | (2020.01) |

(52) U.S. Cl.
CPC ............... *H05B 45/10* (2020.01); *F21S 9/03* (2013.01); *H02J 7/35* (2013.01); *H05B 45/37* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 2009/0039797 A1* | 2/2009 | Wang | H01M 10/44 315/246 |
| 2011/0068624 A1* | 3/2011 | Dibachi | H02J 7/35 307/18 |
| 2015/0062859 A1* | 3/2015 | Kimberley | F21S 9/03 362/1 |
| 2015/0296599 A1* | 10/2015 | Recker | H05B 37/0272 315/153 |

\* cited by examiner

*Primary Examiner* — Wei (Victor) Y Chan
*Assistant Examiner* — Henry Luong
(74) *Attorney, Agent, or Firm* — DeNovo Legal PC

(57) ABSTRACT

A modular LED lighting system, comprising a coordinator module comprising a coordinator microcontroller electrically coupled to a coordinator communication circuit; a slave module comprising: a slave microcontroller; a slave communication circuit for communicating with the coordinator communication module; and a driver circuit for supplying power to one or more electrically connected LED lights; wherein the slave microcontroller is operable to automatically determine a loading of any LED lights electrically coupled to the driver circuit and in response cause the driver circuit to deliver an appropriate current to the LED lights from a selected power source, the power source being selected by the coordinator microcontroller from one of a solar powered source and mains powered source based on one or more predefined power selection rules evaluated by the coordinator microcontroller.

6 Claims, 5 Drawing Sheets

Base Power Distribution Flow Chart

MODULAR SOLAR LIGHTING AND POWER MANAGEMENT SYSTEM AND APPARATUS

FIELD OF THE INVENTION

The present invention relates to a system and method for selectively powering LED lighting from various sources including a solar powered source, battery powered source and mains powered source.

BACKGROUND OF THE INVENTION

Improvements in solar technology have seen a dramatic increase in the number of homes and businesses equipped with solar powered systems. Typically these systems are capable of being connected to grid power, such that when there is insufficient solar power available to drive a connected load, the system can switch to grid power.

Such hybrid systems can also be configured for powering lighting throughout a home or business. These systems have the potential to save a great deal of money in lighting costs, particularly when deployed on a large scale. However, limitations with current technology require that hybrid lighting installations are built to specification, such that any changes to the lighting configuration may require substantial modification of the associated hardware (e.g. backbone, driver circuits, etc.) to meet the new requirements. It would be advantageous if there was provided a hybrid system that readily adapted to changed lighting requirements without the need for substantial modification of the system itself.

SUMMARY OF THE INVENTION

In an aspect of the present invention there is provided a modular LED lighting system, comprising: a coordinator module comprising a coordinator microcontroller electrically coupled to a coordinator communication circuit; a slave module comprising: a slave microcontroller; a slave communication circuit for communicating with the coordinator communication module; and a driver circuit for supplying power to one or more electrically connected LED lights; wherein the slave microcontroller is operable to automatically determine a loading of any LED lights electrically coupled to the driver circuit and in response cause the driver circuit to deliver an appropriate current to the LED lights from a selected power source, the power source being selected by the coordinator microcontroller from one of a solar powered source and mains powered source based on one or more predefined power selection rules evaluated by the coordinator microcontroller.

In an embodiment a battery powered source is additionally selectable by the coordinator microcontroller.

In an embodiment a first of the predefined power selection rules dictates that the solar powered light source is selected when there is sufficient solar power available to deliver the appropriate current. In an embodiment where there is insufficient solar power available, a second of the predefined power selection rules dictates that the battery powered source is selected where the battery powered source has sufficient charge to deliver the appropriate current.

In an embodiment where there is both insufficient solar power and battery power available, a third of the predefined power selection rules dictates that the mains powered source is selected where the mains powered source is operational.

In an embodiment the available power/charge of the various power sources is continuously evaluated by the coordinator microcontroller to determine which power source is selected for powering the LED light(s).

In an embodiment the coordinator communication circuit and slave communication circuit are operable to communicate with each other over a mesh network.

In an embodiment the system further comprises a switch operable to wirelessly communicate with one or both of the coordinator communication circuit and slave communication circuit for turning electrically coupled LED lights on and off.

In an embodiment the switch further comprises a dimmer control for controlling dimming of the LED circuit.

In an embodiment the coordinator module comprises a driver circuit for supplying power to one or more LED lights electrically connected thereto and wherein the coordinator microcontroller is operable to communicate with the driver circuit for automatically determining a loading of any electrically coupled LED lights and in response cause the driver circuit to deliver an appropriate current at a predefined voltage to the LED lights from a selected power source.

In an embodiment the system further comprises at least one additional slave module and wherein each of the respective slave communication circuits and coordinator communication circuit communicate over the mesh network.

In an embodiment the system further comprises a 3-core power cable to which the coordinator and each slave module are connected and wherein the 3-core power cable is operable as a backbone for delivering power from a selected power source to the respective driver circuits.

In an embodiment the battery power is sourced from one or more batteries which are electrically connected to individual slave modules and wherein the microcontrollers of the respective modules are communicable with each other for determining how to distribute battery power from the electrically connected batteries to the driver circuits.

In an embodiment, dependent on a charge state, power from one electrically connected battery may be supplied to multiple driver circuits, via the 3-core power cable.

In an embodiment the microcontroller for each of the slave modules connected to a battery implements a battery management routine for controlling charging of the battery from one of the solar powered source and mains powered source.

In an embodiment the coordinator module is operable to directly connect to the mains powered and solar powered source and output a regulated DC voltage to the respective slave driver circuits.

In an embodiment the controller module further comprises a boost buck regulator for the voltage regulation.

In accordance with a second aspect there is provided a coordinator module for a lighting system, comprising: a microcontroller electrically coupled to a communication circuit which is operable to communicate with one or more a slave modules; and a driver circuit for supplying power to one or more electrically connected LED lights; wherein the microcontroller is operable to automatically determine a loading of any LED lights electrically coupled to the driver circuit and in response cause the driver circuit to appropriately power the LED lights based on the determined loading from a selected power source, the power source being selected by the microcontroller from one of a solar powered source and mains powered source based on one or more predefined power selection rules.

In an embodiment the coordinator module is operable to cause driver circuits electrically connected to the slave modules to source power from the selected power source for power loads electrically coupled to the driver circuits.

In accordance with a third aspect there is provided a slave module for a lighting system, comprising: a microcontroller electrically coupled to a communication circuit which is operable to communicate with a coordinator module; and a driver circuit for supplying power to one or more electrically connected LED lights; wherein the microcontroller is operable to automatically determine a loading of any LED lights electrically coupled to the driver circuit and in response cause the driver circuit to appropriately power the LED lights based on the determined loading from a selected power source, the power source being selected by a microcontroller of the coordinator module from one of a solar powered source and mains powered source based on one or more predefined power selection rules evaluated by the coordinator module microcontroller.

In a fourth aspect there is provided an LED lighting module, comprising: a driver circuit for supplying power to one or more electrically connected LED lights; a microcontroller which is operable to automatically determine a loading of any LED lights electrically coupled to the driver circuit and in response cause the driver circuit to deliver power to the LED lights from a selected power source, the power source being selected by the microcontroller from one of a solar powered source and mains powered source based on one or more predefined power selection rules evaluated by the coordinator microcontroller.

In an embodiment the microcontroller monitors an available voltage level of the solar power source and when the level is insufficient to deliver the required power to the LED lights the microcontroller selects the mains powered source for driving the LED lights.

In an embodiment a battery power source is additionally selectable by the coordinator microcontroller and wherein the microcontroller monitors an available voltage of both the battery source and the solar power source, such that when there is insufficient solar power available the battery power source is selected for powering the LED lights until the battery power source is no longer able to provide the necessary power at which time the microcontroller selects the mains powered source.

In an embodiment the available power/charge of the various power sources is continuously evaluated by the microcontroller to determine which power source is selected for powering the LED light(s).

In an embodiment the microcontroller is additionally configured to cause the solar powered source to charge the battery powered source when the LED light(s) are not switched on and there is sufficient power available for charging the battery powered source and wherein the microcontroller causes the solar powered source to cease charging at a predetermined charge level to prevent overcharging of the battery.

In an embodiment the microcontroller is additionally configured to cause the solar powered source to charge the battery powered source while the solar power source is delivering power to the LED light(s) provided there is sufficient power for both charging and powering the LED light(s), as determined from the monitored charge and power levels.

In an embodiment the module further comprises a boost circuit which is operable to boost an operating voltage of the solar and/or battery power to match a higher operating voltage for the LED light(s).

In an embodiment the driver is operable to be electrically connected to the mains powered and solar powered source and comprises a circuit operable to output a regulated DC voltage for powering the LED light(s).

In an embodiment the battery powered source comprises one or more deep charge batteries.

Any publications mentioned in this specification are herein incorporated by reference. Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers, integers or steps.

The features and advantages of methods of the present invention will become further apparent from the following detailed description of preferred embodiments and the accompanying figures.

BRIEF DESCRIPTION OF THE ACCOMPANYING FIGURES

DETAILED DESCRIPTION OF PREFERRED EMBODIMENTS OF THE INVENTION

Figure 1:
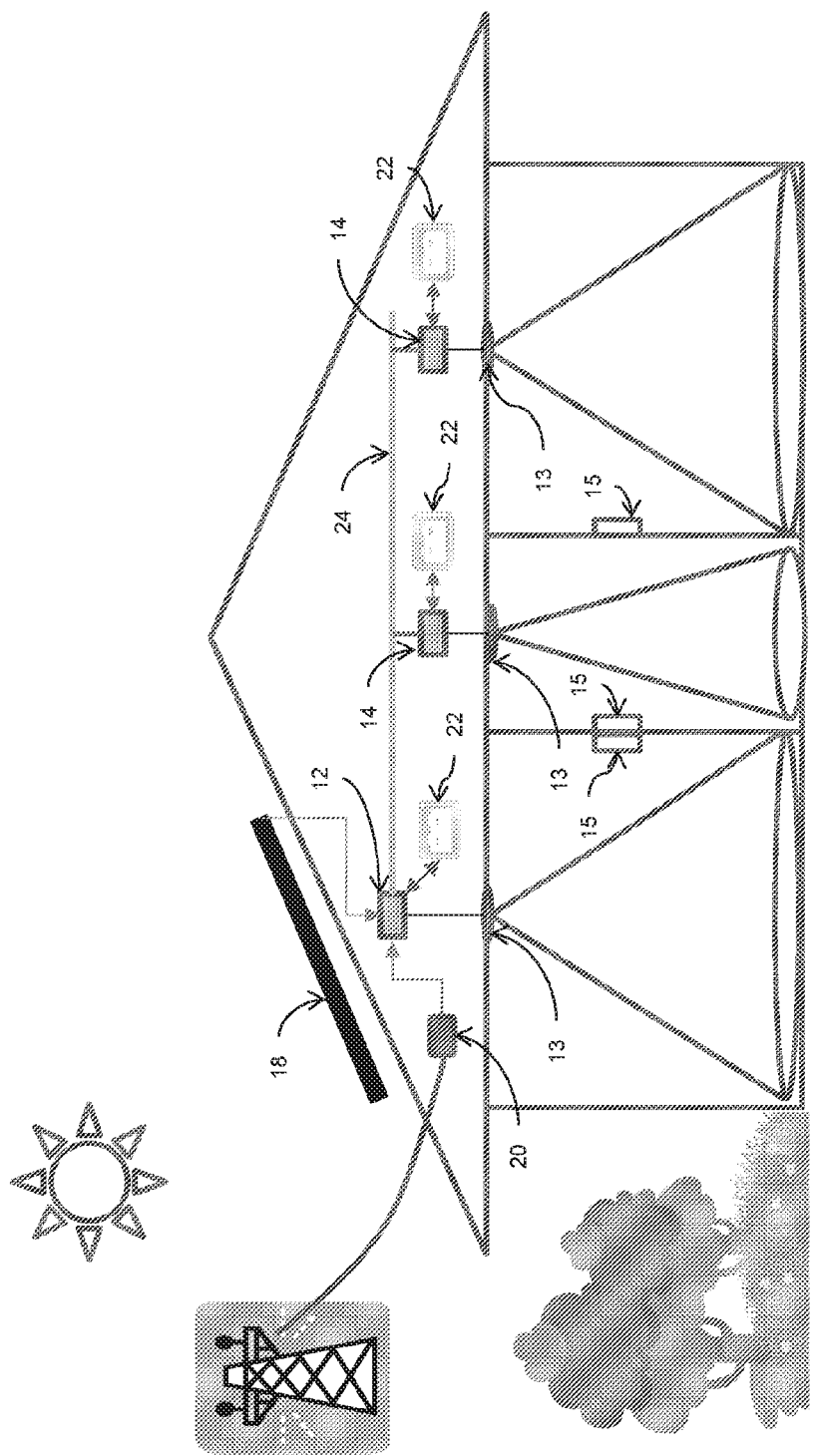
FIG. 1 is a schematic view of a modular lighting system in accordance with an embodiment of the present invention.
Figure 2:
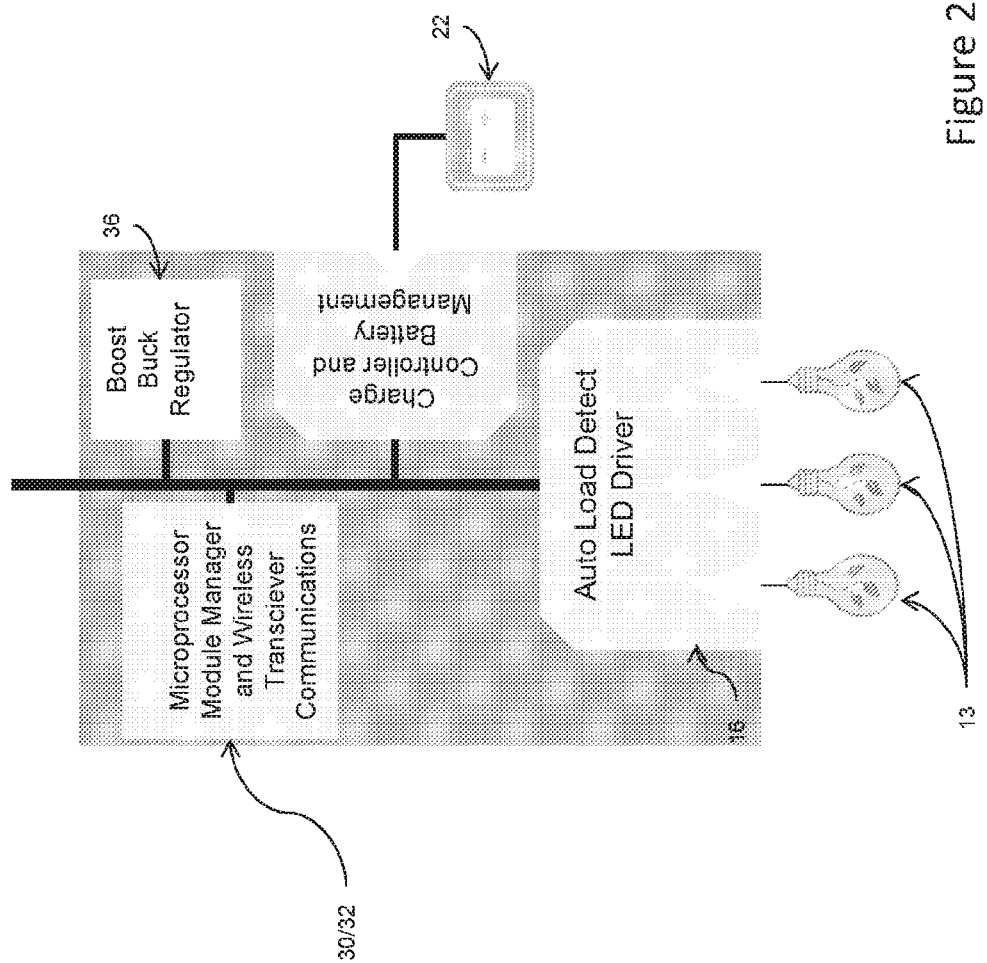
FIG. 2 is a schematic view of the coordinator and slave modules shown in FIG. 1.
Figure 3:
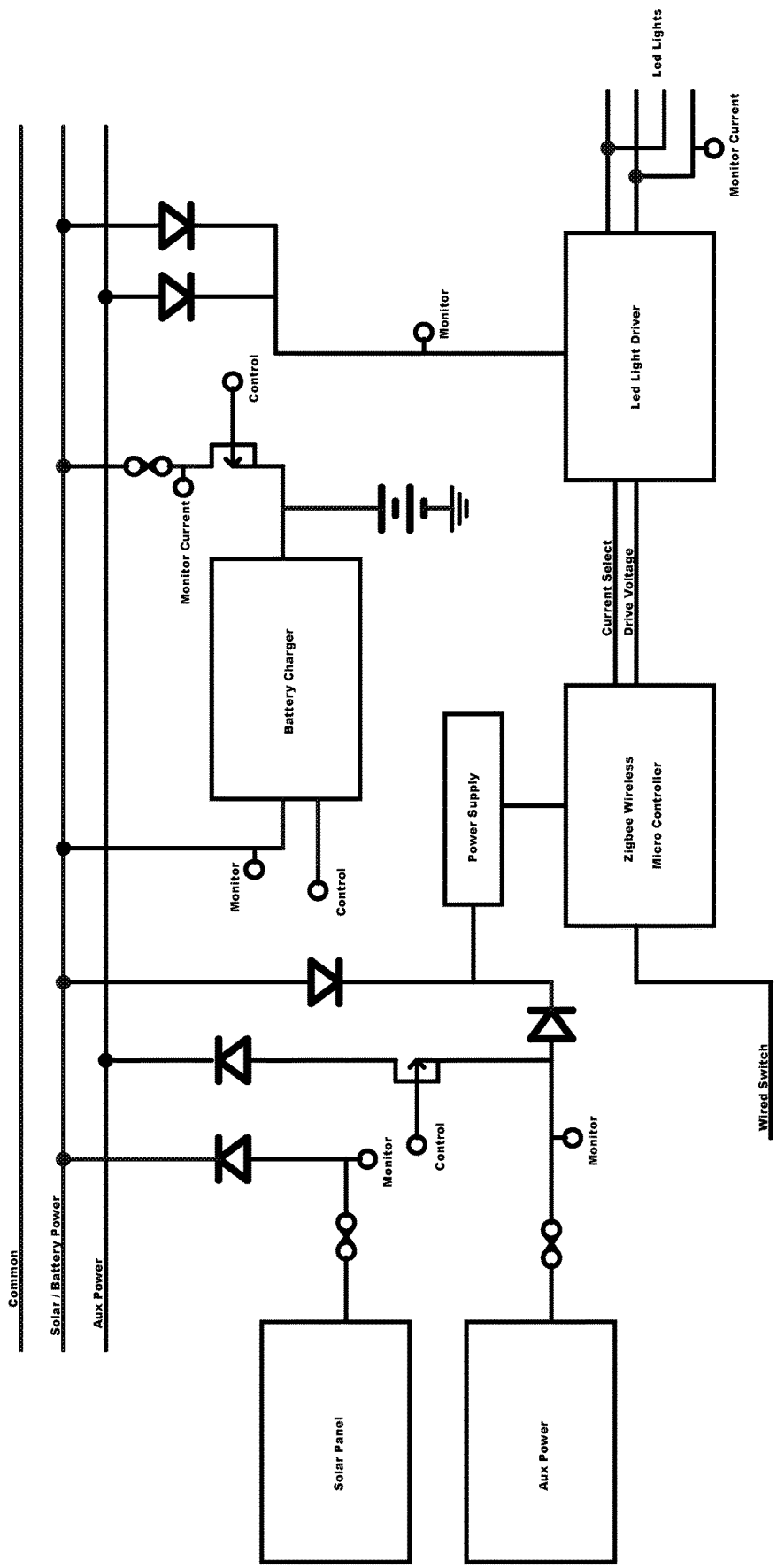
FIG. 3 is a schematic showing various connections for a coordinator module, in accordance with an embodiment.

With reference to FIGS. 1 to 3, there is shown a modular LED lighting system 10 comprising a coordinator module 12 and a plurality of slave modules 14 communicable therewith. Both the coordinator module 12 and slave modules 14 comprise driver circuits 16 for driving electrical loads connected thereto. According to embodiments of the present invention, the electrical loads take the form of one or more energy efficient LED lights 13. Also shown in FIG. 1 are wireless switches 15 that are communicable with the modules 12, 14 for turning on/off and controlling dimming of selected LED lights 13.

The coordinator module 12 is electrically connected to various power sources, including a solar powered source 18 and a backup mains powered source 20 (in this case taking the form of a 1236 volt low voltage power supply). According to embodiments described herein, the solar powered source takes the form of one or more 250 Watt photovoltaic solar panels 19. An energy storage device in the form of one or more batteries 22 may also be provided. The coordinator module 12 is operable to implement a power management program. The program evaluates various power selection rules to determine which of the electrically connected power sources 18, 20, 22 is to be used for powering the respective driver circuits 16 of connected modules 12, 14. According to embodiments described herein, power from the solar powered source 18, backup mains powered source 20 (and optionally the battery sources 22) is distributed via a power backbone 24.

An advantage of the system 10 described herein is that it may accommodate any number of slave modules 14 and switches 15, dependent only on the power available from the respective power sources and total power usage/loading of LED lights coupled to the respective slave modules 14. Thus, slave modules 14 can readily be added or removed at any time to cater for varying lighting requirements over time, simply by connecting/removing the slave modules 14 to/from the power backbone 24. A further advantage is that solar panels 19 and batteries 22 can be dynamically added for increasing the total power available from these sources.

In more detail, and with additional particular reference to FIG. 2, each of the coordinator module 12 and slave modules 14 (noting that only one slave module is shown for ease of description) implement a microcontroller 30 for performing various communication, automated load determination and power management functions, as will be described in more detail in subsequent paragraphs. In addition, the coordinator module 12 and slave modules 14 each implement a transceiver circuit 32 for communicating with each other. According to embodiments described herein, the transceiver circuits 32 take the form of 2.4 Ghz wireless transceivers that are communicable with one another (as well as any wirelessly "paired" switches 15) over a mesh network, using known wireless mesh protocol communication techniques. The initial configuration process will now be described in more detail.

When a coordinator module 12 is to be configured with one or multiple slave modules 14 (i.e. over the same backbone 24) they first need to be "grouped". The grouping process is a sequence completed by an installer, involving an initiation sequence whereby each of the modules 14 is controlled to broadcast a signal and the radio signal strength (RSS) of each module is measured by the coordinator 12 for determining which modules are to be included in the grouping. When the initiation sequence is complete, the coordinator and slave modules 12, 14 may communicate as a single system and recognise that they are operating on the same solar circuit. As previously mentioned, the modules 12, 14 may also be paired to wireless switches 15 which form the end devices on the mesh network. Switches 15 are paired with the relevant coordinator and/or slave modules based on the light control required (e.g. switching the light(s) on or off, and dimming). It will be understood that a single switch 15 could be paired to multiple modules 12, 14 so as to manage any number of connected lights, switching them on or off, or controlling the LED light intensity "dimming". The wireless communication of the grouped and paired network of modules 12, 14 and switches 15 described above may also transparently relay or forward communications from modules 12, 14 and switches 15 connected to other groups creating a true mesh network.

The subsequent communications between the modules 12, 14 over the mesh network include exchanging status information and commands relating to power availability, power consumption/loading, light status (i.e. on/off), battery charge and storage levels. In a particular embodiment, the slave modules 14 are each configured to broadcast the following information for electrically connected lights: (a) on/off status; (b) intensity (c) driver power status (d) input voltage level. This exchange of information allows the coordinator module 12 to manage the available solar power, either stored in batteries 22 or direct from the photovoltaic panels 19 in the most efficient manner, while at all times delivering uninterrupted light on demand. According to the preferred embodiment, the backup mains power source 20 is only used when all green power sources 18, 22 are unavailable or depleted.

Each of the modules 12, 14 are additionally operable to implement an auto load detection capability for automatically determining a loading of any LED lights 13 electrically coupled to the corresponding driver 16. In a particular embodiment, auto load detection comprises a first step of switching on a connected LED light. The microcontroller 30 is operable to take multiple high frequency samples of current and voltage as the connected LED light starts to conduct. It will be understood by persons skilled in the art that an LED light 13 will typically contain multiple LEDs, often referred to as an "LED array". The number of LEDs in the array that are connected in series (referred to herein as a "string") can be used determine the "turn on" voltage for the LED light array. By way of example, the microcontroller 30 may be programmed to recognise that an individual LED has a forward voltage of between 2.73.0 Volt. By determining the voltage of the LED light at the point where current starts to ramp up (i.e. as determined by the microcontroller 30 through the sampling step discussed above), the number of LED in the string can be determined. For example, where the sampling indicates a ramping up of current at 29 volts, the microcontroller 30 can determine that the series string contains 10 individual LEDs. This information along with the current draw sampled at the same time is subsequently used by the microcontroller 30 to determine the number of LED strings that are connected in parallel within the array. Once the above parameters of the LED array are known, the microcontroller 30 can determine the effective LED array wattage which in turn is utilised to set the corresponding operational parameters for the LED driver 16 so as to optimize power delivered to the detected LED light through constant current regulation. Where multiple LED lights 13 of the same type are connected to the same driver, the microcontroller 30 can determine the loading or combined wattage in the same manner.

The driver circuits 16 subsequently select and regulate the power supplied to the electrically connected LED light(s) based on constant current drawn from the electrically connected LED load. According to embodiments described herein, current regulation is achieved using a Buck Boost pulse width regulator 36. Such a configuration advantageously compensates for the different power sources and potentially wide fluctuations in the power output by the solar power source. The load determinations are also communicated to the microcontroller 30 of the coordinator module 12 for evaluation by the power management program, as will be described in more detail in subsequent paragraphs.

The auto load detection capability of the modules 12, 14 is particularly advantageous as it provides the overall system 10 with the flexibility to add or remove LED lights to/from the system as required, without having to manually adjust operational drive parameters or modify the associated driver hardware (as is required for conventional systems which employ dedicated LED drivers for specific LED light arrays). Instead, loading of connected lights can be automatically determined avoiding any mismatch between LED Drivers and LED light capacity (i.e. which can be detrimental to both light output and reliability of the LED array).

Figure 4:
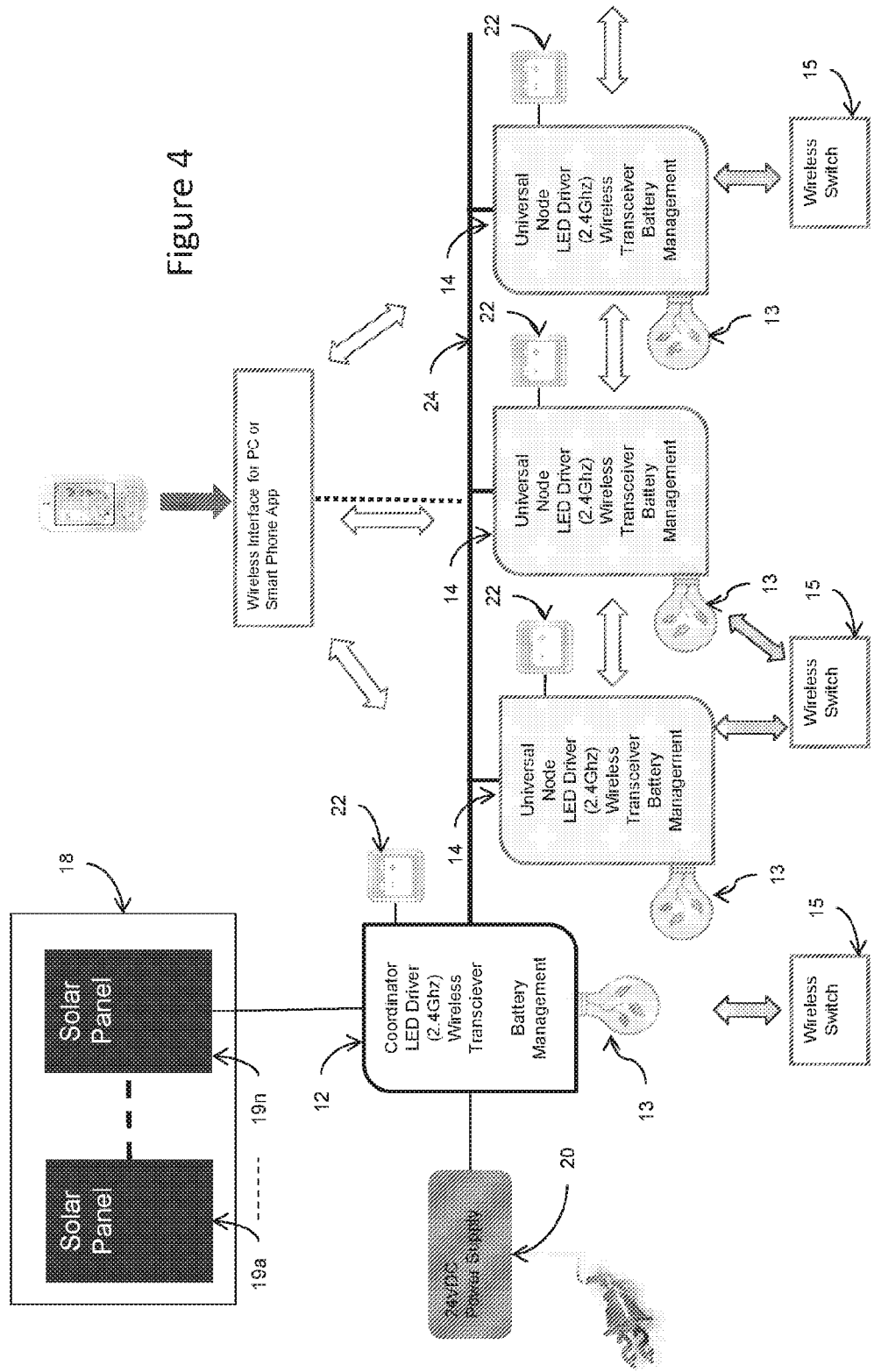
FIG. 4 is a schematic illustrating power distribution among the various modules of FIG. 1, in accordance with an embodiment.

As particularly shown in FIGS. 3 & 4, the coordinator module 12 is directly connected to both the solar power source 18 and mains power source 20. Power from each of these sources 18, 20 is subsequently distributed to the respective slave driver circuits 16 over the power backbone 24, which according to the illustrated embodiment takes the form of a 3-core power cable. More particularly, the 3-core backbone has one conductor as a common ground, one conductor allocated to distributing low voltage mains (i.e. as backup power) and the remaining conductor allocated to distributing solar power and battery power, as controlled by the coordinator module 12.

As previously mentioned, each of the modules 12, 14 may additionally be electrically connected to individual batteries 22. In this regard, each of the microcontrollers 30 are operable to implement a battery management routine that monitors a charge state of an electrically connected battery 22 and controls the appropriate charging thereof. The charge state is additionally communicated to the microprocessor 30 of the coordinator module 12 for evaluation by the power management program.

In more detail, any batteries connected to the slave modules 14 are used as energy storage and supply devices and thus configured as deep cycle devices. The battery connected to the coordinator module 12 is used in a slightly different manner. To avoid constant switching between power sources caused by load (i.e. when solar power is still available), the battery connected to the coordinator module 12 may be used as a dampener or buffer for the solar source 18, thereby improving the power efficiency of the system 10. When there is insufficient or no solar power available (e.g. caused through cloud and/or shadows, or when the angle of the sun is insufficient to satisfy the power needs of the system) the coordinator module 12 will cause the system to switch to battery power (i.e. provided by the respective slave module batteries which are individually switched and gated by diodes to the backbone 24 as needed). Once switched, the respective slave driver circuits 16 are able to draw from the cumulative battery capacity of the system 10. The coordinator module 12 is the last to switch its power to the backbone 24. Once the batteries have been drained, the driver circuits 16 of both the slave and coordinator modules 12, 14 will switch to backup mains power 20, which is available on the backbone 24 at all times (i.e. via the dedicated conductor).

Figure 5:
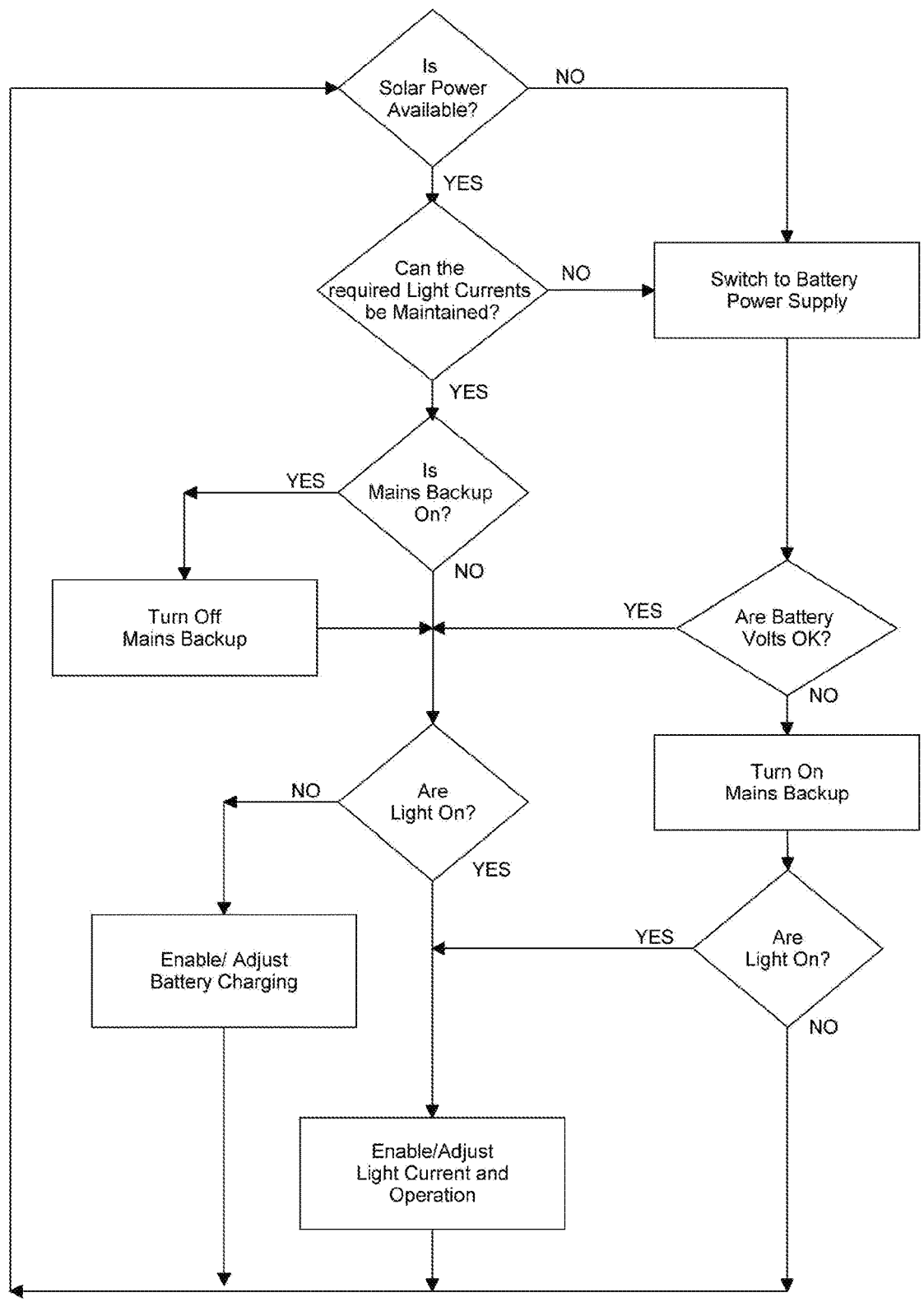
FIG. 5 is a base power distribution flow chart, according to an embodiment.

With additional reference to FIG. 5, there is shown a flow chart illustrating various determinations/rules implemented by the power management program of the coordinator module 12.

In a first step S1, the program determines whether there is sufficient solar power available for powering connected drivers 16. The coordinator 12 monitors the solar output and loads the solar source (i.e. using the electrically connected lights) to determine solar power availability.

At step S2, responsive to determining that there is sufficient solar power available, the power management module evaluates whether the required light current can be maintained. This involves evaluating the loading of the LED light(s) connected to the coordinator module 12 and any slave modules 14 (communicated from the respective slave microcontroller 30, as previously described). More specifically, each of the driver circuits 16 are operable to continuously monitor for a low voltage level indicator, which is an indicator that current cannot be maintained and that either a power boost or switch of power sources is required.

At step S3, if light current can be maintained (i.e. no low voltage level indications have been detected), the microcontroller 30 of the coordinator module 12 determines whether the mains backup 20 is on and if so disables it at step S4. If at step S3 the mains backup 20 is determined to be off, the process proceeds directly to step S5, which involves determining whether the lights are switched on for each of the connected drivers 16. In this regard it will be understood that the coordinator and slave modules 12, 14 are each responsible for the management and control of their respective LED driver. For those driver circuits 16 that do not have any lights switched on, batteries 22 electrically connected thereto are charged (if required) from the selected power source (step S6). Battery charging is managed by the microcontrollers of the individual modules 12, 14 to which the batteries are connected. If the lights are switched on, then at step S7 the corresponding driver circuits enable/adjust light current and operation, as required. The process then returns to step S1.

Returning to steps S1 and S2, if either determination results in a negative output, then the coordinator module 12 causes the driver circuit(s) 16 to switch to battery power supply (step S8). The available battery charge is evaluated at step S9 and if there is sufficient voltage the process returns to step S5, as previously described. If there is insufficient voltage, the mains backup 20 is turned on (step S10) and the driver circuits (16) are instructed to source power from the regulated mains power supply. Step S11 is the same as for step S5, which involves determining whether lights are switched on and, if yes, process flow returns to step S7. Otherwise, the process returns directly to step S1.

As shown in FIG. 4, a smart phone or PC can connect to the wireless mesh network for controlling operation of (i.e. switching on/off and dimming) LED lights electrically connected thereto. This is achieved through a suitable user interface and programming language which is communicable with the coordinator microcontroller 30.

In an alternative embodiment to that described above, the slave modules are operable to each perform the functions of the coordinator module and have direct access to the various connectable power sources 18, 20, 22. In other words, the slave modules (which can now be considered and will hereafter be referred to as "independent controller modules") each implement a microcontroller 30 which is operable to automatically determine a loading of any LED lights electrically coupled to the driver circuit and in response cause the driver circuit to deliver power to the LED lights from a connected power source (i.e. one of a solar powered source, mains power source or batter power source), based on one or more predefined power selection rules evaluated by the microcontroller 30. Such an embodiment is particularly suited for home or office lighting and optimises the green power resources at any point in time, extending battery life while minimising wire losses through reduced current levels.

In more detail, each of the independent controller module microprocessors 30 monitors the voltage levels of both solar source 18 and battery source 22, while also monitoring charge and draw currents. Based on these readings the microprocessor 30 is programmed to calculate the most effective and efficient power usage, while preventing overcharge and/or discharge battery states. Based on battery status the solar power (i.e. from source 18) is gated to a charge circuit/charge boost circuit (not shown), or direct supply to the driver 16. This not only utilises the green power resources in the most efficient way, but also enhances the life of the battery 22 by minimising the battery cycle count and depth of discharge. A battery management routine implemented by the microprocessor 30 can safely charge a variety of deep charge batteries and batteries of different chemistry, including lead acid, AGM, lithium ion and LiFePO$_4$. In a particular embodiment, the battery 22 comprises a 24 VDC (+3/−2) lithium ion battery and the and preferred Solar Panel is 24V type. According to a particular embodiment, the operating voltage of the system 10 and driver 16 is 30~45 VDC. This allows the system 10 to operate at reduced current levels reducing cable losses. If there is a situation where solar power is not available and the battery resources have been depleted, the microprocessor gates the 12~18 VDC mains backup source 20 to the boost circuit ensuring the system delivers seamless lighting in all situations 24/7 365 days of the year.

In an office environment the preferred configuration may not require a battery. In this case the independent controller module may be configured with solar panels and mains back-up. This allows the solar power 18 to be used during office hours. The mains backup 20 would be gated in during cloudy periods or late evenings again delivering seamless efficient lighting at all times. Alternatively, the independent controller module could be configured with a smaller battery system to further improve efficiency allowing extend green power operation. An advantage of the independent controller module is seamless lighting while delivering that lighting with the highest possible green power content.

The independent controller modules may advantageously be connected to the master/slave system 10 of FIG. 1 (i.e. such that they operate as slave modules), if desired. In this scenario, the modules may each implement a boost circuit that matches/boost the battery voltage from 24V to the same voltage as the FIG. 1 system.

It will be understood by persons skilled in the art that numerous variations and/or modifications may be made to the invention without departing from the spirit or scope of the invention as broadly described. For example, the skilled addressee would be able to readily modify the control system yet still obtain clamping of the blade of the saw. The present embodiments are, therefore, to be considered in all respects as illustrative and not restrictive.

The invention claimed is:

1. A modular LED lighting system, comprising:
   a coordinator module comprising a coordinator microcontroller electrically coupled to a coordinator communication circuit;
   a slave module comprising:
   a slave microcontroller;
   a slave communication circuit for communicating with the coordinator communication module; and
   a driver circuit for supplying power to one or more electrically connected LED lights;
   wherein the slave microcontroller is operable to automatically determine a loading of any LED lights electrically coupled to the driver circuit and in response cause the driver circuit to deliver an appropriate current to the LED lights from a selected power source, the power source being selected by the coordinator microcontroller from one of a solar powered source and mains powered source based on one or more predefined power selection rules evaluated by the coordinator microcontroller, wherein the coordinator communication circuit and slave communication circuit are operable to communicate with each other over a wireless network,
   wherein the coordinator module comprises a driver circuit for supplying power to the one or more LED lights electrically connected thereto and wherein the coordinator microcontroller is operable to communicate with the driver circuit for automatically determining a loading of any electrically coupled LED lights and in response cause the driver circuit to deliver an appropriate current at a predefined voltage to the LED lights from the selected power source,
   further comprising a 3-core power cable to which the coordinator communication circuit and each slave module are connected and wherein the 3-core power cable is operable as a backbone for delivering power from the selected power source to respective driver circuits,
   wherein the modular LED lighting system also operates from battery power, the battery power is sourced from one or more batteries which are electrically connected to individual slave modules, and wherein microcontrollers of respective modules are communicable with each other for determining how to distribute the battery power from the one or more batteries to the driver circuit.

2. The modular LED lighting system in accordance with claim 1, wherein, dependent on a charge state, power from one electrically connected battery may be supplied to multiple driver circuits, via the 3-core power cable.

3. The modular LED lighting system in accordance with claim 1, wherein the microcontrollers connected to a battery implements a battery management
   routine for controlling charging of the battery from one of the solar powered source and mains powered source.

4. A modular LED lighting system, comprising:
   a coordinator module comprising a coordinator microcontroller electrically coupled to a coordinator communication circuit;
   a slave module comprising:
   a slave microcontroller;
   a slave communication circuit for communicating with the coordinator communication circuit; and
   a driver circuit for supplying power to one or more electrically connected LED lights;
   wherein the slave microcontroller is operable to automatically determine a power draw of said one or more LED lights that are electrically coupled to the driver circuit, and in response cause the driver circuit to deliver an appropriate fixed current, based on said power draw determined by the slave controller, to the LED lights from a selected power source,
   the power source being selected by the coordinator microcontroller from one of a solar powered source and mains powered source based on one or more predefined power selection rules evaluated by the coordinator microcontroller, wherein the slave microcontroller determines the power draw of the LED lights by taking multiple high-frequency samples of current and voltage as the LED light starts to conduct, and determining a point where the current starts to ramp up, and using the point where the current starts to ramp up as the forward voltage of the LED lights, using the forward voltage to determine the number of LEDs in the array, and using the number of LEDs in the array to determine the effective LED array wattage to optimize power through constant current regulation at the effective LED array wattage.

5. A coordinator module for a lighting system, comprising:
   a microcontroller electrically coupled to a communication circuit which is operable to communicate with one or more slave modules; and
   a driver circuit for supplying power to one or more electrically connected LED lights;
   wherein the microcontroller is operable to automatically determine a loading of any LED lights electrically coupled to the driver circuit and in response cause the driver circuit to appropriately power the one or more electrically connected LED lights based on the determined loading from the selected power source to deliver an appropriate fixed current, based on said power draw determined by the slave controller, to the LED lights from a selected power source, the power source being selected by the microcontroller from one of a solar powered source and mains powered source based on one or more predefined power selection rules, wherein there are multiple individual slave modules, and wherein the system also operates from battery power, then the battery power is sourced from one or more batteries which are electrically connected to the individual slave modules, and wherein microcontrollers of respective individual slave modules are communicable with each other for determining how to distribute battery power from the one or more batteries to the respective driver circuits.

6. A slave module for a lighting system, comprising:
a microcontroller electrically coupled to a communication circuit which is operable to communicate with a coordinator module; and
a driver circuit for supplying power to one or more electrically connected LED lights;
wherein the microcontroller is operable to automatically determine a loading of any LED lights electrically coupled to the driver circuit and in response cause the driver circuit to appropriately power the one or more electrically connected LED lights based on the determined loading, to cause the driver circuit to deliver an appropriate fixed current, based on said power draw determined by the slave controller, to the LED lights from a selected power source, the selected power source being selected by a microcontroller of the coordinator module from one of a solar powered source and mains powered source based on one or more predefined power selection rules evaluated by the coordinator module microcontroller, wherein the system also operates from battery power and the battery power is sourced from one or more batteries which are electrically connected to individual modules, and wherein microcontrollers of respective modules are communicable with each other for determining how to distribute battery power from the one or more batteries to the respective driver circuits.

* * * * *